United States Patent

Hillmann et al.

[11] Patent Number: 5,772,338
[45] Date of Patent: Jun. 30, 1998

[54] FLANGE OR RACEWAY GUIDED PLASTIC CAGE FOR BEARING ASSEMBLY

[75] Inventors: Reinhart Hillmann, Schweinfurt; Rut Heemskerk, Kützberg, both of Germany

[73] Assignee: SKF GmbH, Germany

[21] Appl. No.: 702,964

[22] Filed: Aug. 26, 1996

[30] Foreign Application Priority Data

Aug. 30, 1995 [DE] Germany .................... 195 31 905.2

[51] Int. Cl.[6] .................... F16C 19/00; F16C 33/46; F16C 33/56
[52] U.S. Cl. .................... 384/470; 384/576; 384/577; 384/580
[58] Field of Search .................... 384/470, 572, 384/576, 577, 580

[56] References Cited

U.S. PATENT DOCUMENTS

| | | | |
|---|---|---|---|
| 4,623,270 | 11/1986 | Olschewski et al. | 384/576 |
| 4,952,079 | 8/1990 | Lingner | 384/572 |
| 5,033,876 | 7/1991 | Kraus | 384/577 |
| 5,033,878 | 7/1991 | Tsuji et al. | 384/576 |

FOREIGN PATENT DOCUMENTS

| | | | |
|---|---|---|---|
| 1469988 | 12/1966 | France . | |
| 3401025 | 7/1985 | Germany | 384/576 |
| 3422657 | 12/1985 | Germany | 384/576 |

*Primary Examiner*—Daniel P. Stodola
*Assistant Examiner*—Matthew A. Kaness
*Attorney, Agent, or Firm*—Eugene E. Renz, Jr., P.C.

[57] ABSTRACT

In a raceway-guided or flange-guided cage made of plastic for roller bearings, webs (18) between side rings (14) and (16) are specially designed to prevent foreign particles present in the lubricant from damaging contact surfaces (S) of rollers (R). For this purpose, guide surfaces (26) are provided only at edges of rollers (R). Intermediate web side surfaces (30, 32) are set back from contact surface (S) by a wider gap (G). Retaining projections (40) are also separated by a gap ($G_1$) from contact surface (S) in the axial center, the point of greatest flexiblity for the snapping-in of the rollers.

3 Claims, 3 Drawing Sheets

FLANGE OR RACEWAY GUIDED PLASTIC CAGE FOR BEARING ASSEMBLY

BACKGROUND OF THE INVENTION

The present invention relates to improvements in flange guided or raceway guided plastic cages of bearing assemblies.

Plastic cages for bearing assemblies are not new per se. A plastic cage wherein having retaining projections either in the central area of the rollers or at their ends is known from French Patent No. 1,469,988. The cage shown in the French Patent provides sufficient retention compacity to prevent the rollers from falling out before the cage has been inserted between the bearing rings and while the rollers are being assembled. During operation, the rollers contact the surfaces of the pockets on the sides of the webs and thus displace the cage in a circumferential direction. An alternative is for one of the bearing rings to guide the cage with contact with its lateral surfaces. These cages therefore have continuous axial pocket surfaces which therefore guide the rollers over the entire length of the rollers.

Even though these cages are generally suitable for the purposes intended, it has been found that they have certain disadvantages and drawbacks. For example, under harsh operating conditions there is no way to prevent dirt particles entrained in the lubricant from being transported between the rollers and guide surfaces, or then from passing across the contact surface of the roller. If the dirt particles are hard, they can damage the contact surface of the roller which necessitates replacement. The plastic material of the cage actually aides this process in that the hard particles can embed themselves in the surface of the plastic under these circumstances, tend to scrape away at the roller continuously.

SUMMARY OF THE INVENTION

With the foregoing in mind, it is an object of the present invention to provide a plastic cage which overcomes the problems and difficulties of the prior cages discussed above and is characterized by novel features of construction and arrangement so that the foreign particles present in the lubricant can not cause damage to the rollers. To this end in accordance with the present invention, the webs of the cage constructed in accordance with the present invention, are provided with retaining projections in certain sections and with guide surfaces in other sections. The guide surfaces are located in the edge areas of the rollers and the side surfaces of the webs between the guide surfaces are separated from the roller by a gap. The retaining projections are located between the guide surfaces and in the installed state are separated from the roller by the gap. By this arrangement lubricant and therefore foreign particles entrained therein move in an unimpeded way through the gaps or open spaces so formed. Consequently by this arrangement, particles entrained in the lubricant do not embed themselves in the surfaces of the pocket and thus the contact surfaces of the rollers remain undamaged.

In the case of roller bearings of advanced design, the load zone of under the rollers generally does not extend uniformly all the way to the two axial ends. Even in the case of cylindrical rollers therefore a slight convexity or at least a tapering off at the end is provided. By this design even under full load, the ends of the rollers are subjected to small partial stresses, whereas under partial load, the reduced stresses can even approach zero. In accordance with the present invention, the central area of the roller between very narrow areas at the ends is free of contact with a cage during operation. Thus, the lubricant can pass through the spaces here and provide the advantages noted above.

It is preferred that the retaining projections for the rollers are located in the central area of the web to take advantage of the greatest flexibility for assembly of the rollers. However, during operation, the projections are not in contact with the lateral or peripheral surfaces of the rollers and are displaced relative to the rollers essentially the same distance as the side ring surfaces remaining between the guide surfaces. In other words, the distance of the projections from the lateral or peripheral surface of the rollers is at least as great as the distance of the surface of the side ring between the guide surfaces from the end surface of the rollers. This is possible because of the precise way in which the cage is guided on the raceway or the flange of a bearing ring. The cage is thus guided in the radially direction and therefore is no relative motion between the roller and the cage.

The ends of the webs are provided with roller guide surfaces which guide only the ends of the rollers. These guide surfaces center the rollers in the otherwise open pockets of the cage.

The present invention thus provides a plastic cage which prolongs the service life the bearing by keeping the contact surfaces of the rollers free of damage.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
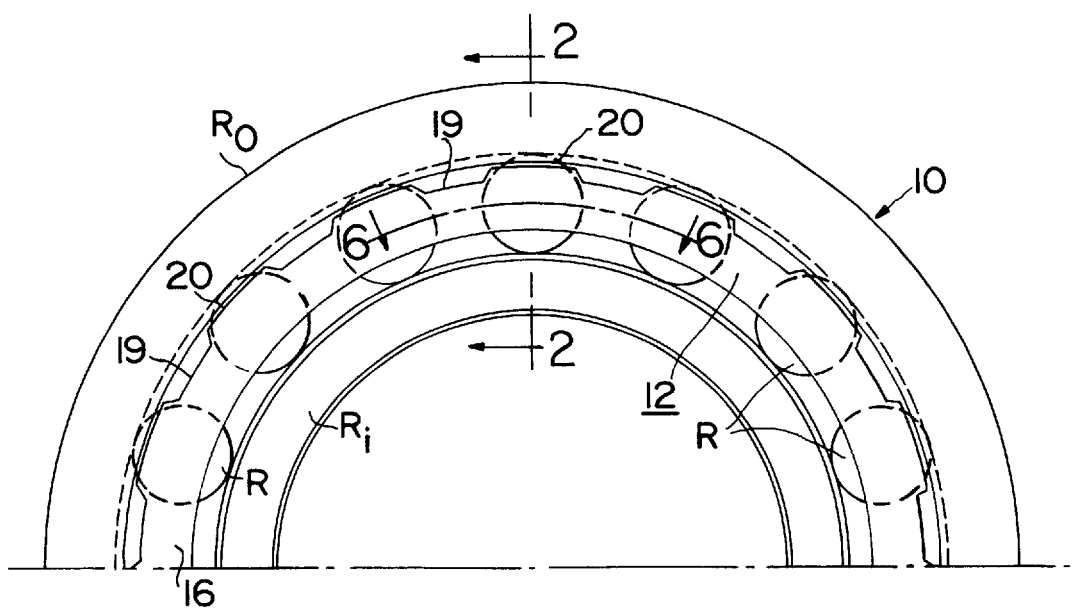
FIG. 1 is a side elevational view of one-half of a typical roller bearing incorporating a cage made in accordance with the present invention.
Figure 2:
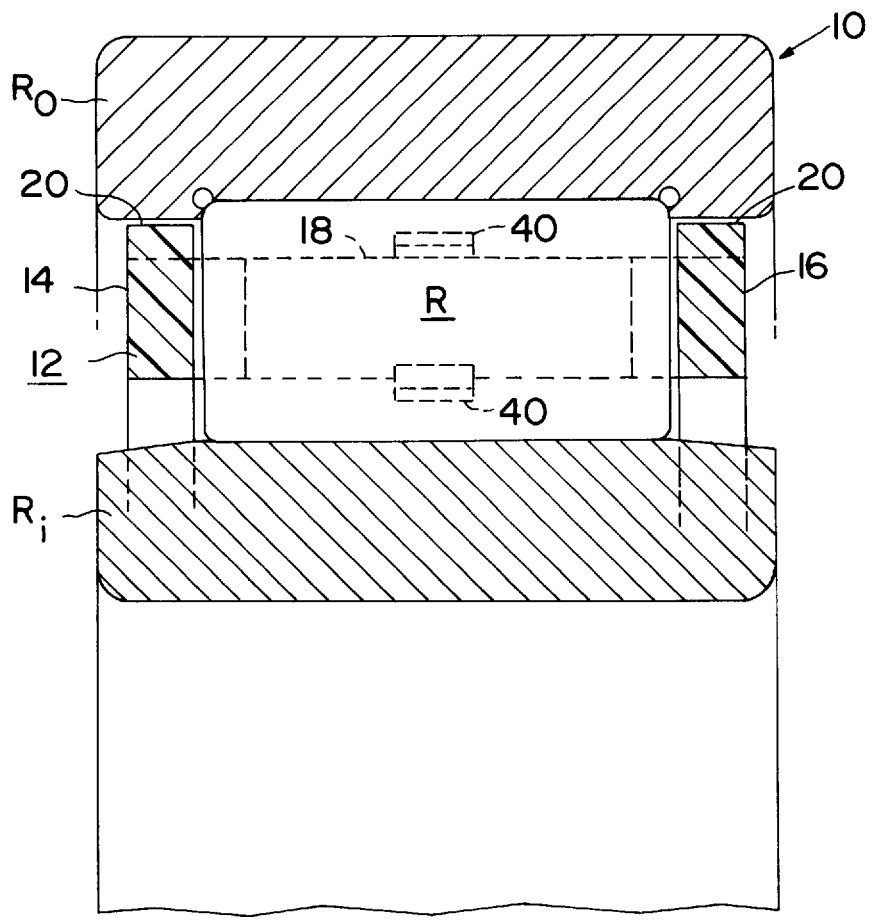
FIG. 2 is an enlarged fragmentary sectional view taken on lines 2—2 of FIG. 1.
Figure 3:
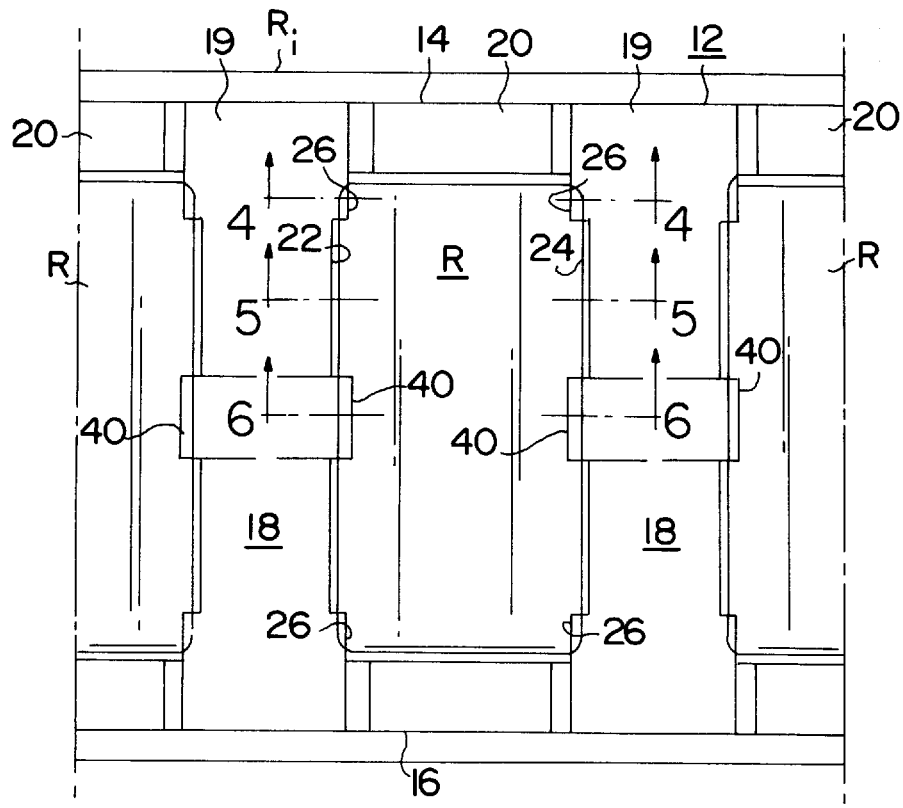
FIG. 3 is an enlarged fragmentary development sectional plan view taken on lines 3—3 of FIG. 1.
Figure 4:
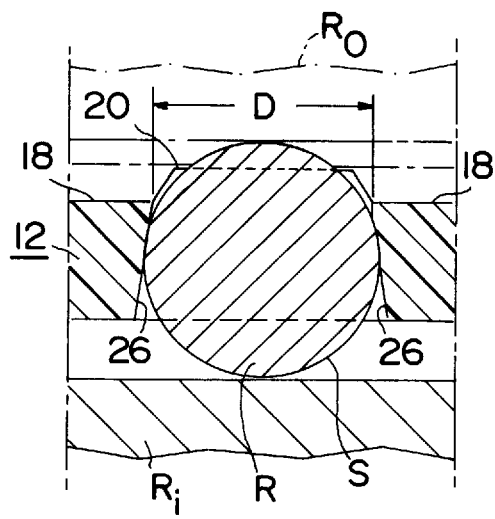
FIG. 4 is a sectional elevational view taken on lines 4—4 of FIG. 3.
Figure 5:
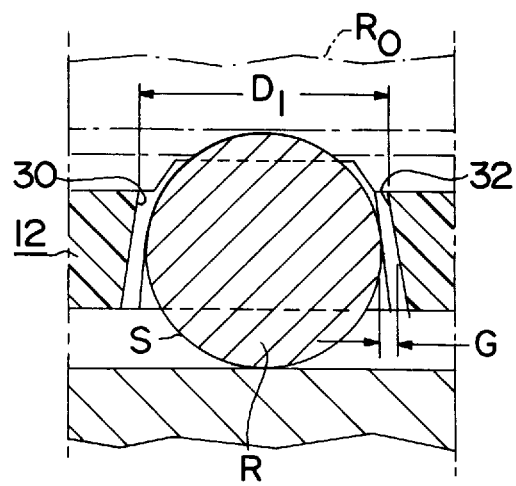
FIG. 5 is a sectional elevational view taken on lines 5—5 of FIG. 3.

Referring now to the drawing and particularly to FIG. 1 thereof, there is shown a bearing assembly generally designated by the numeral (10) including a cage (12) made in accordance with the present invention. The bearing assembly comprises the usual inner and outer rings $R_i$ and $R_o$ and a series of rollers R in the annular space between the rings. The rollers are circumferentially spaced in the annular space between the rings by the cage (12).

Figure 7:
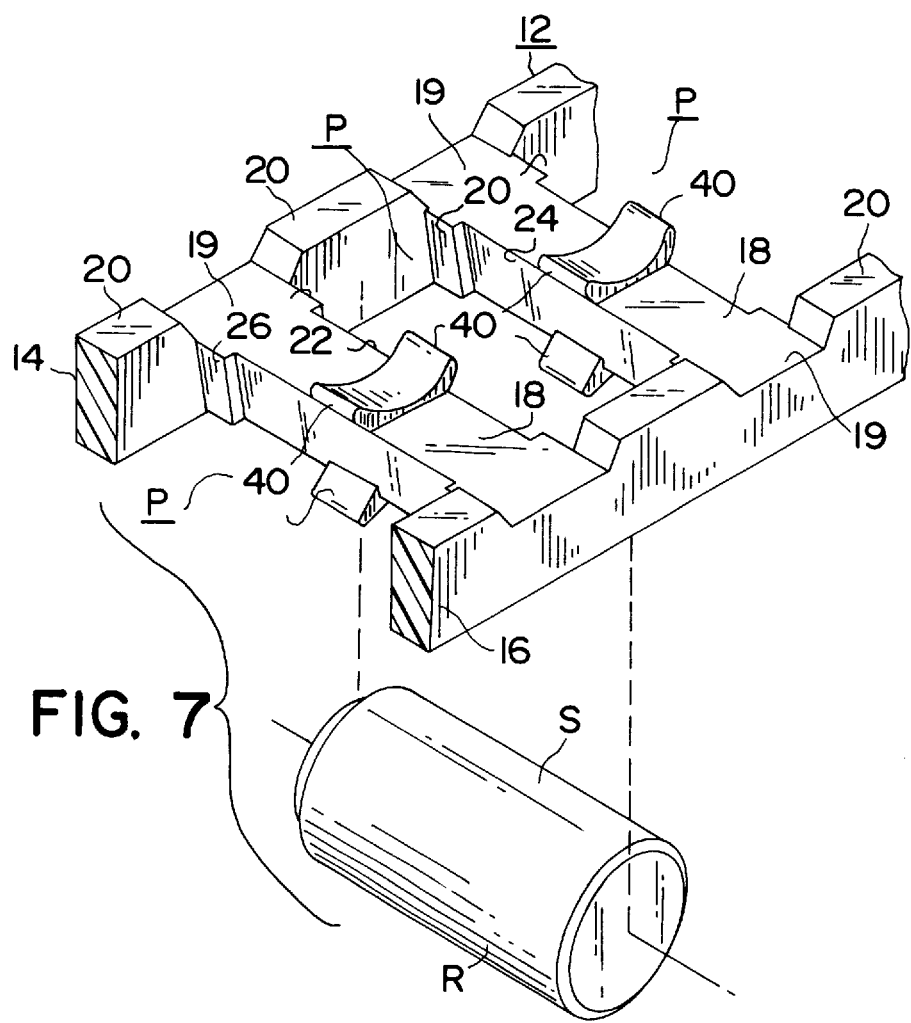
FIG. 7 is an exploded isometric view of a fragmentary developed portion of the cage shown in FIGS. 3–6 inclusive with the rollers of the bearing shown removed.

As shown best in FIG. 7, the cage (12) comprises a pair of annular members or side rings (14) and (16) and a series of axially extending circumferentially spaced webs (18) which define a plurality of circumferentially equi-spaced pockets P about the periphery of the cage. As shown, the cage (12) is guided radially on the raceway of the outer ring by lateral surfaces (20) which project from the annular members (14) and (16). The side rings are of a scalloped configuration to define a series of recesses (19) in the areas of the webs.

In accordance with the present invention, the cage pockets P are profiled in a predetermined manner to define spaces or gaps between the sidewalls of the cage pockets which confront the rollers so that during operation of the bearing any dirt or foreign particles entrained in the lubricant do not become lodged in the cage pockets to cause damage to the peripheral surfaces of the rollers in the manner described above in connection with the prior art cages. Thus, as best illustrated in FIGS. 3–7, the confronting sidewalls (22) and (24) of the webs defining each pocket P is of stepped configuration and are mirror images of one another. More specifically, the web sidewalls are provided with guide surfaces (26) extending inwardly from each axial end of the cage a short distance which are spaced apart a distance D providing only a small clearance between the guide surface (26) and the peripheral surface S of the cylindrical rollers R. The guide surfaces (26) guide the rollers only adjacent the outer most edge areas of the contact surfaces S of the rollers R. The confronting sidewalls (22) and (24) of each pocket P are cut back as at (30) and (32) in the central zone of the sidewalls so that the confronting sidewalls in this zone are spaced apart a distance $D_1$, greater than the distance D between the guide surfaces and create a gap G between the peripheral surface of the rollers in the manner illustrated in FIGS. 5 and 6. The gap G between the sidewall faces (30) and (32) and the peripheral surfaces of the rollers is preferably more than 0.25 mm.

Figure 6:
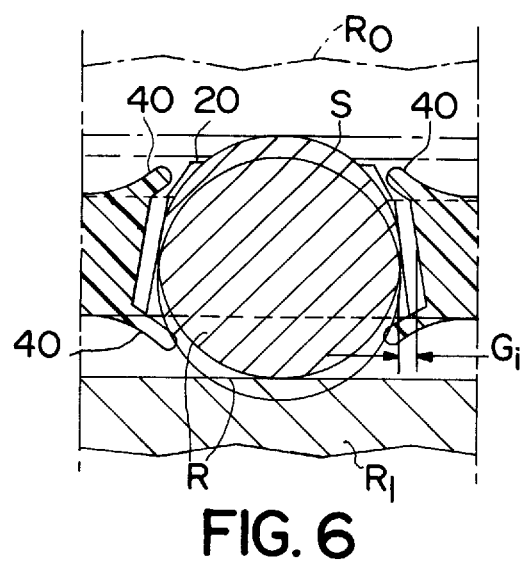
FIG. 6 is a sectional elevational view taken on lines 6—6 of FIG. 3.

Retaining projections (40) are provided in the axial center of the webs as best illustrated in FIG. 6. As illustrated in FIG. 6, the sidewall of the cage in the area of the projections is separated by a wide gap $G_1$, in the same order as the gap G between the surfaces (30) and (32). Accordingly, since the cage is guided radially on the raceway and since the cylindrical rollers are guided by their edge areas in the pocket by the four edge areas provided by the projections defined by the guide surfaces (26), the gap G between the side surfaces (30) and (32) of the webs and the peripheral surface S of the rollers remains constant at all times even during operation. Accordingly, any foreign particles entrained in the lubricant can pass through the gaps G and $G_1$ unimpeded. This eliminates the problem of embedding in plastic cages characteristic of the prior cages which cause damage to the peripheral surfaces of the rollers.

Even though a particular embodiment of the invention has been illustrated and described herein, it is not intended to limit the invention and changes and modifications may be made therein with the scope of the following claims. For example, even though the invention is described in connection with a bearing assembly having cylindrical rollers, the principal of the cage design can be adapted to other types of roller bearings as well.

What is claimed is:

1. A roller bearing assembly comprising inner and outer annular races (Ri and Ro) having confronting raceways spaced apart to define an annular space for a plurality of rollers (R);

a cage (12) having a pair of axially spaced circumferentially extending side rings (14 and 16);

a plurality of webs (18) extending axially between said side rings and circumferentially spaced apart to define a plurality of pockets (P) for the rollers;

the outer peripheral surface of said side rings adapted to be closely adjacent one of said races to guide said cage (12) radially;

the webs (18) having side surfaces confronting the rollers including guide surfaces (26) extending inwardly a predetermined distance from the side rings providing only a small clearance between the guide surface (26) and the peripheral surface of the rollers;

the confronting side surfaces (30 and 32) of the webs between the guide surfaces (26) being cut back to provide a gap of a greater clearance between the rollers and the web than at said guide surfaces (26);

each of said webs (18) having projections (40) facing one another at the central portion of the web to embrace the rollers, the space between the adjacent projections (40) being less than the diameter of the roller to retain the rollers in the pocket; and means defining a plurality of circumferentially-spaced recesses aligned with the webs to promote circulation of lubricant.

2. A roller bearing assembly is claimed in claim 1 wherein the gap between the side surfaces (30 and 32) of the web and the roller (R) is more than 0.25 mm.

3. A roller bearing assembly is claimed in claim 1 wherein the webs are provided with radial recesses (44) extending over and beyond the side rings in the area of the guide surface (26).

* * * * *